United States Patent [19]

Raetzel

[11] Patent Number: 5,148,611
[45] Date of Patent: Sep. 22, 1992

[54] MULTIMEASUREMENT GAUGE ASSEMBLY

[75] Inventor: David W. Raetzel, Norco, Calif.

[73] Assignee: Beatrice/Hunt-Wesson, Inc., Fullerton, Calif.

[21] Appl. No.: 668,192

[22] Filed: Mar. 12, 1991

[51] Int. Cl.⁵ ............................................. G01B 5/02
[52] U.S. Cl. ....................................... 33/783; 33/712; 33/549
[58] Field of Search ................ 33/712, 783, 784, 792, 33/793, 803, 804, 805, 806, 810, 812, 811, 549

[56] References Cited

U.S. PATENT DOCUMENTS

| | | |
|---|---|---|
| 2,403,893 | 7/1946 | Aller et al. |
| 2,870,542 | 1/1959 | Gasper |
| 2,876,550 | 3/1959 | Tomkow |
| 3,197,873 | 8/1965 | Aller ........................ 33/793 |
| 3,250,012 | 5/1966 | Hilton et al. |
| 3,325,904 | 6/1967 | Backus |
| 3,596,362 | 8/1971 | Reason |
| 3,769,713 | 11/1978 | Norman |
| 4,160,326 | 7/1979 | Griesbach |
| 4,170,068 | 10/1979 | Forsmann |
| 4,208,796 | 6/1980 | Michaud et al. ........ 33/784 |
| 4,217,694 | 8/1980 | Bowling |
| 4,280,278 | 7/1981 | Forsman |
| 4,324,049 | 4/1982 | Blose |
| 4,366,624 | 1/1983 | Bergstrom |
| 4,586,261 | 5/1986 | Beaupere |
| 4,680,865 | 7/1987 | Danielli et al. |
| 4,741,108 | 5/1988 | Cohen ...................... 33/783 |

FOREIGN PATENT DOCUMENTS

| | | | |
|---|---|---|---|
| 651959 | 11/1962 | Canada. | |
| 0462265 | 6/1928 | Fed. Rep. of Germany | ........ 33/810 |
| 1012008A | 4/1983 | U.S.S.R. | |

OTHER PUBLICATIONS

Fowler Product Literature. pp. 192 and 193 (date unknown).

Primary Examiner—William A. Cuchlinski, Jr.
Assistant Examiner—C. W. Fulton
Attorney, Agent, or Firm—Pretty, Schroeder, Brueggmann & Clark

[57] ABSTRACT

A compact, highly flexible but accurate multimeasurement gauge assembly facilitates many of the measurements required for an automated three piece can manufacturing operation using one gauge. The gauge assembly includes a gauge block having left, right, front and back edge bordering a top reference surface. A measurement well is formed in the top surface adjacent the left edge and slidably receives a digital measurement indicator that may be latitudinally positioned at any one of a plurality of different measurement positions. At least one longitudinally extending track having a slidable reference post is disposed opposite one of the measurement positions to enable measurements using the post as a mechanical stop for positioning a partially manufactured can at various stages in the manufacturing process. A cylindrical post is positionable opposite a measurement position to facilitate flange width measurements and a set of three posts provide a stable three point position reference for measurement of the squareness of a cut body blank.

24 Claims, 6 Drawing Sheets

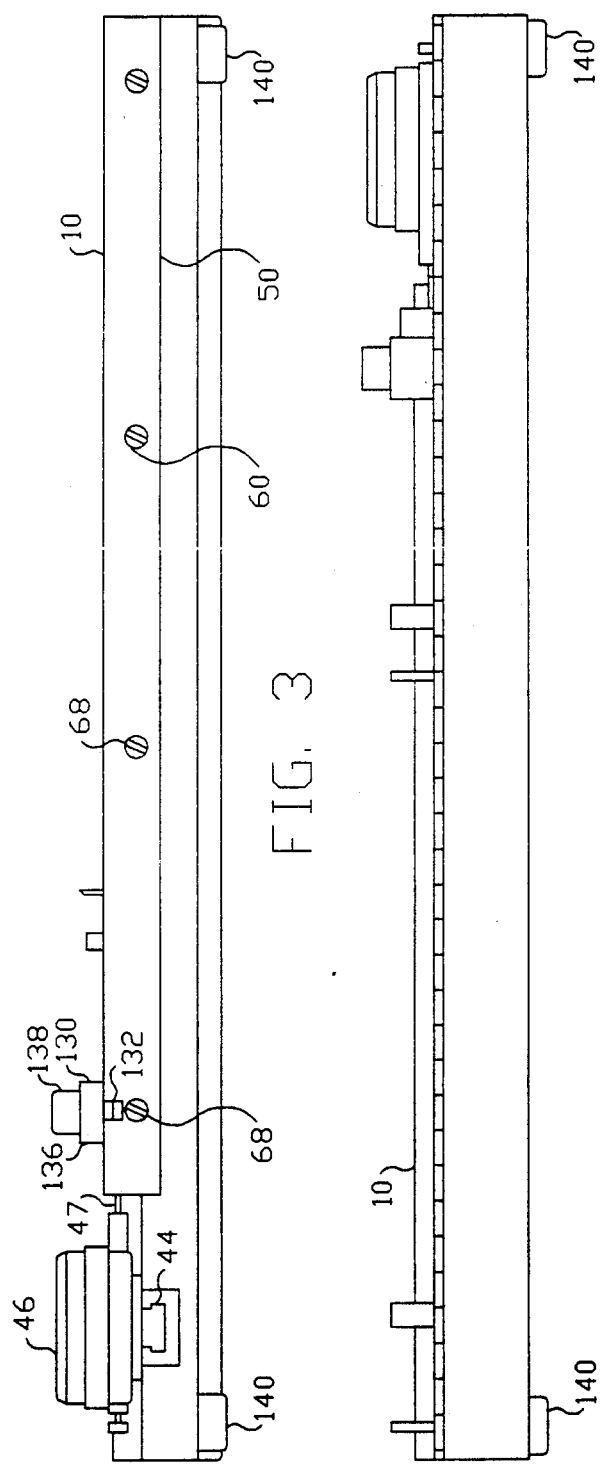

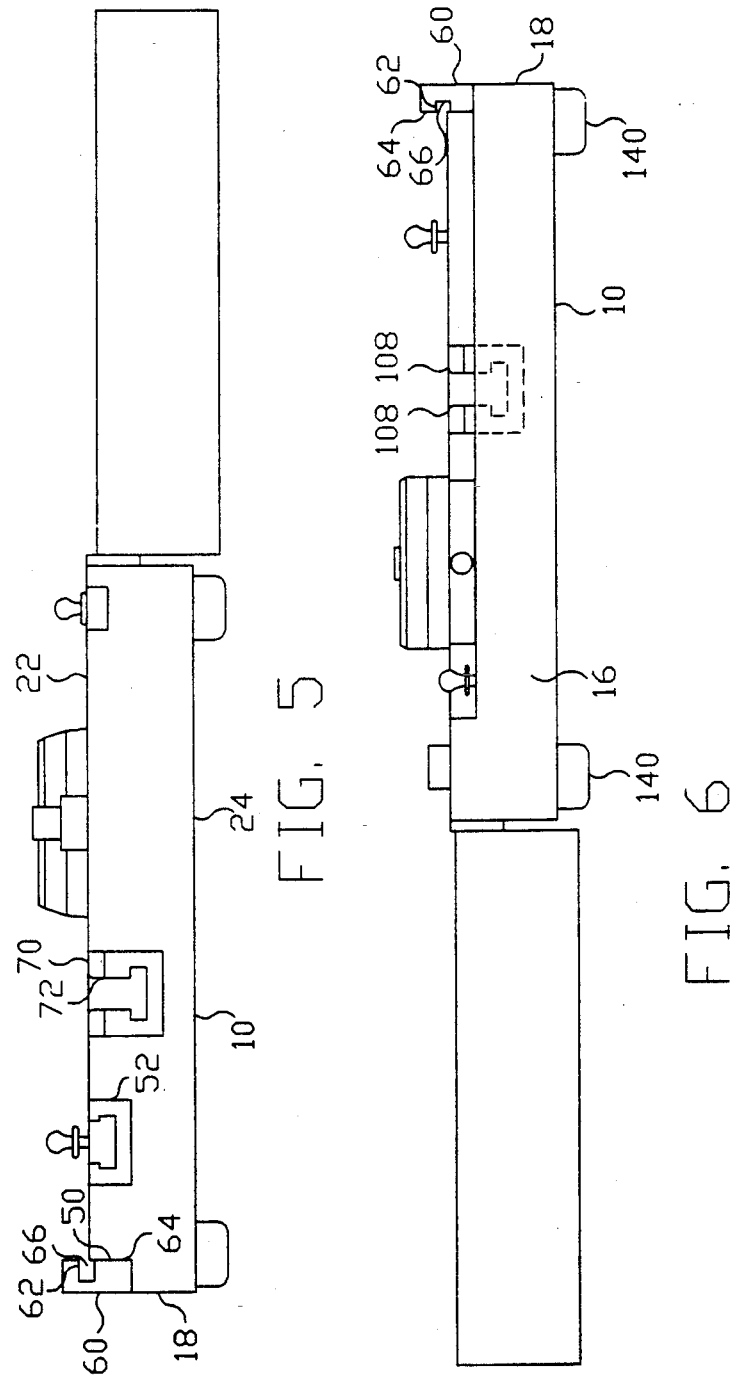

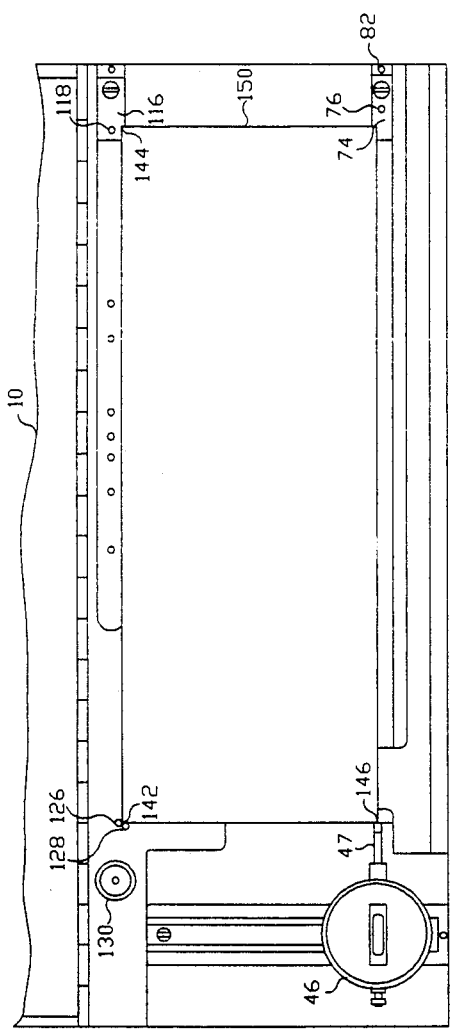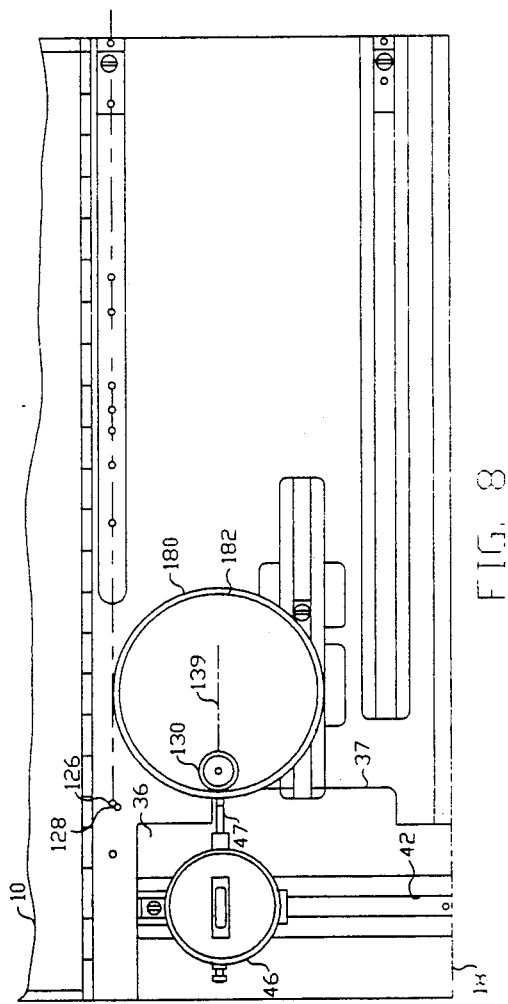

MULTIMEASUREMENT GAUGE ASSEMBLY

BACKGROUND OF THE INVENTION

Metal cans for food storage and other uses are manufactured in large quantities by high speed assembly lines using highly automated procedures. The high degree of automation that is used for can manufacturing helps to reduce manufacturing costs and ultimately the purchase price of food or other goods bought by consumers. However, for high speed, automated can manufacturing systems to work properly, the cans must meet certain high precision measurement requirements at several different stages of manufacture.

One popular metal can known as a three piece can is manufactured by cutting sheets of tin plate into rectangular sheets called body blanks which represent the first piece. These body blanks must meet certain dimensional specifications with respect to length, width, thickness and squareness before they can be further manufactured.

The body blanks are then rolled into a cylinder and welded along the adjoining edges to form a seam. Ideally, the two pairs of mating corners which occur at each end of the seam are in exact alignment. However, some degree of misalignment necessarily occurs in a factory process and is acceptable as long as it does not exceed certain tolerance requirements. This misalignment is known as cockiness and must be measured to assure that the cockiness does not exceed a maximum value.

If the cylinder meets manufacturing specifications, the ends are flared radially outward to form a flanged cylinder. Again, the flanged cylinder must meet certain tolerance specifications with respect to can length and flange width.

The flanged cylinder is then made into a factory finished can by securing a sheet metal disk, i.e. end, to one end of the flanged cylinder. This disk represents the second part of a three part can. The third part is a sheet metal disk that is secured to the opposite end after the can has been filled. The can length or height as well as the diameter of the closed end of the can must be measured to assure that the can meets tolerances required by the final filling and closure process.

While the various tolerance measurements that must be made are technologically not difficult, they require fairly bulky equipment in order to attain the required precision. Furthermore, different pieces of test equipment are required for different measurements. Different sets of equipment may also be required for different can sizes.

Because of the bulkiness of the measurement equipment, it has become a common practice to set up a single measurement station in a quality assurance laboratory located near the manufacturing line. From time to time a quality assurance person sample tests the production process by picking a partially finished can in one of the stages of manufacture from the manufacturing line and testing the partially completed can for compliance with manufacturing tolerances.

Most of the time this procedure works satisfactorily. If a tested part is found to be approaching a tolerance limit, an appropriate adjustment is made in the manufacturing process to bring the measurement in question back toward the center of the tolerance range. However, occasionally a more abrupt change in manufactured can dimensions may occur. In this event thousands of cans may pass through the high speed automated manufacturing line before the quality assurance person performs a sample test on the out of tolerance measurement in the quality assurance laboratory. All defective cans manufactured prior to discovery and correction of the defect must be destroyed. The cost for lost materials and processing time can be substantial.

It would thus be desirable to have a multimeasurement gauge assembly for cans that is sufficiently compact that it could be located on the factory floor adjacent the manufacturing line. This would enable line operators to check can measurements more frequently than is practical for quality assurance personnel. Not only could out of tolerance measurements thus be detected sooner, but adjustments could be made to maintain product tolerance closer to the center of the specification range.

SUMMARY OF THE INVENTION

A compact, high accuracy multimeasurement gauge assembly in accordance with the invention enables all of the measurements required for a three piece automated can manufacturing process and for a large range of can sizes. It is therefore unnecessary to maintain a large number of different gauges for different can measurements and different can sizes. The gauge assembly can thus be located on the factory floor adjacent a manufacturing line where a line operator can make frequent measurements of critical can dimensions. A misadjustment condition can thus be detected before the adjustment goes clearly beyond tolerance boundaries or at least before a large number of defective cans have been manufactured.

The multimeasurement gauge assembly includes a substantially solid aluminum rectangular block having left and right edges, front and back edges and top and bottom planar surfaces. The planar top surface serves as a working reference surface and has defined therein four slide slots and one edge slot disposed along the front edge of the block to help eliminate any surface waves from a rectangular sheet metal body blank.

One slide slot extends laterally adjacent the left side of the block and slidably couples to a measurement device having a position reference arm extending therefrom. A recess or measurement well formed in the top surface forms a well region that receives the laterally extending slide. The recess is bounded by a vertically extending sidewall and enables an end of the measurement reference arm to extend both above and below the plane of the top reference surface so as to accurately measure a position of a can part in the plane of the top surface.

A long, longitudinally extending slide adjacent the front edge provides a length reference for length and width measurements, while a shorter, centrally positioned longitudinally extending slide intersects the measurement well and provides a length reference for the height, thickness and cocky body measurements of a prefinished can. A third longitudinally extending slide disposed adjacent the back edge of the block supports a reference pin that cooperates with two aligned corner pins to provide a three point reference that accurately and repeatably measures deviations from squareness of a sheet metal body blank. High coercivity magnets are strategically placed along the shorter slide and elsewhere in the top surface to provide repeatable accurate positioning and to help eliminate surface waviness in sheet metal cut body blanks that are being tested. A reference cylinder is positioned near the top left hand corner of the base. The reference cylinder is threaded on one end and when this cylinder is relocated in a tapped hole on the base, the cylinder can be used as a reference to measure flange width.

BRIEF DESCRIPTION OF THE DRAWINGS

A better understanding of the invention may be had from a consideration of the following Detailed Description, taken in conjunction with the accompanying drawings in which:

FIG. 3 is a front elevation view of the gauge assembly shown in FIG. 2;

FIG. 4 is a back elevation view of the gauge assembly shown in FIG. 2;

FIG. 5 is a side elevation view, taken from the right side of the gauge assembly shown in FIG. 2;

FIG. 6 is a side elevation view, taken from the left side of the gauge assembly shown in FIG. 2;

FIG. 7 is a top plan view of the gauge assembly shown in FIG. 2 illustrating measurement of squareness of a body blank;

FIG. 8 is a top plan view of the gauge assembly shown in FIG. 2 illustrating a flange width measurement;

DETAILED DESCRIPTION OF THE PREFERRED EMBODIMENT

Figure 1:
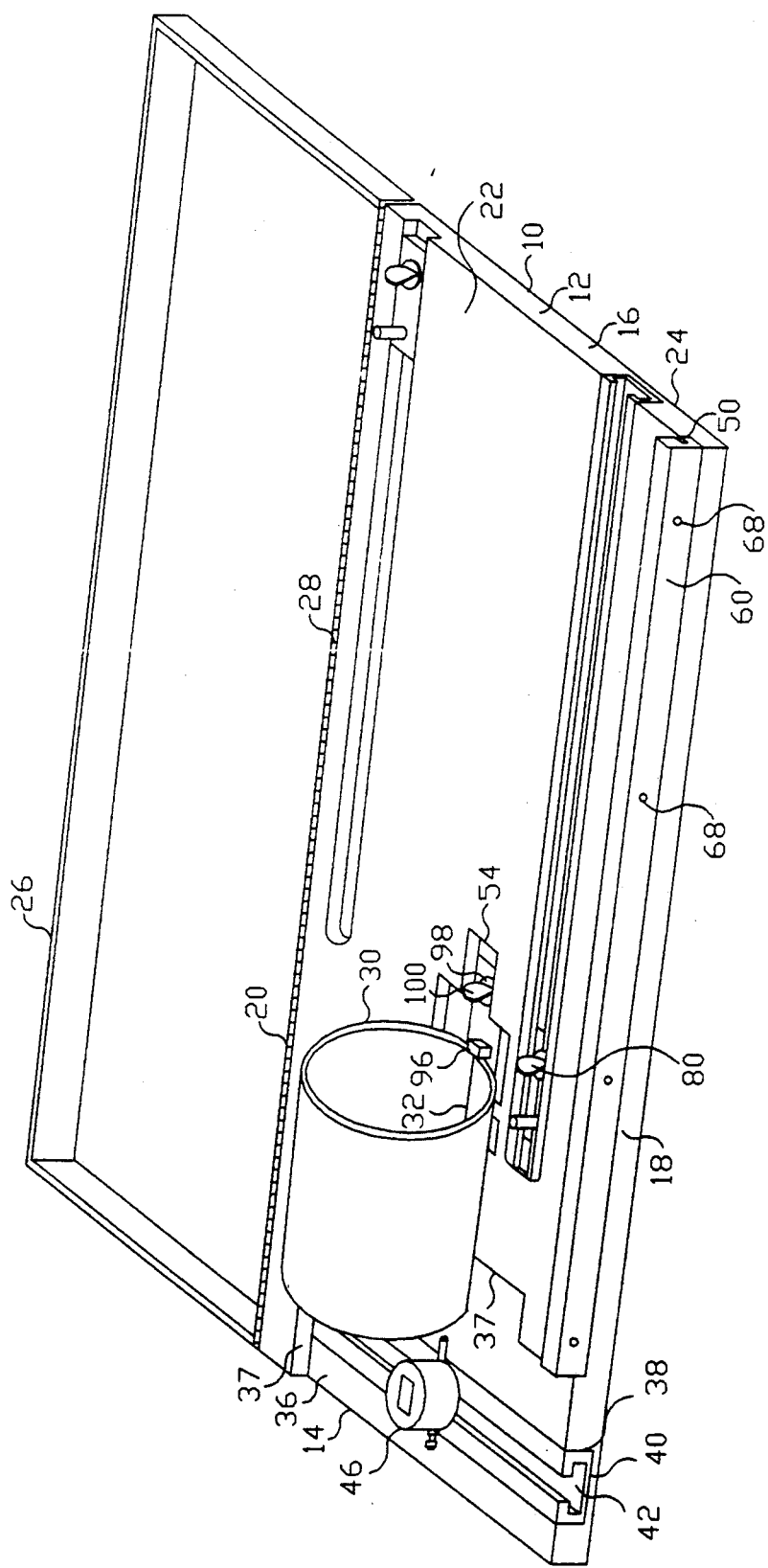
FIG. 1 is a perspective view of a multimeasurement gauge assembly in accordance with the invention shown with a nonflanged cylinder having the height thereof checked.

Referring now to FIG. 1, a multimeasurement gauge assembly 10 in accordance with the invention comprises a substantially solid rectangular aluminum block 12 having a left side edge 14, a right side edge 16, a front edge 18, and a back edge 20. Aluminum block 12 also has a top surface 22 which serves as a working reference surface and a bottom surface 24 which is not visible in the arrangement shown in FIG. 1. A dust cover 26 is secured by hinge 28 at the top rear edge of the aluminum block 12. A nonflanged cylinder 30 having a seam 32 is shown in position on the magnets on reference surface 22 for taking a seam misalignment measurement known in the industry as a cocky body test.

A measurement well or recess 36 is defined in the leftmost extremity of the top surface 22 at a measurement well region of surface 22. Recess 36 is bounded by an irregular sidewall 37 that extends from the bottom of recess 36 into intersection with reference surface 22. The recess 36 further has a latitudinally extending rectangular cross section groove 38 defined in the surface thereof which groove 38 extends from the front edge 18 to adjacent the rear edge 20. The groove 38 further receives a latitudinally extending steel insert 40 having defined therein a latitudinally extending slot 42 having a cross section in the shape of an inverted T. Insert 40 is suitably secured within the groove 38 as by a plurality of bolts (not shown) extending from the bottom surface 24 of aluminum block 12 into the bottom of insert 40 to secure the insert 40 to aluminum block 12. The slot 42 within insert 40 forms a slide track which receives a slider 44 (best seen in FIG. 2) which in turn mounts and maintains a length measurement gauge 46 coupled in latitudinally sliding engagement with the slot 42. Gauge 46 is preferably a digital gauge such as a gauge manufactured by Fowler that has a presettable zero point. Alternative length measuring gauges may of course be used, but will be less convenient if they do not have a presettable zero point.

Figure 2:
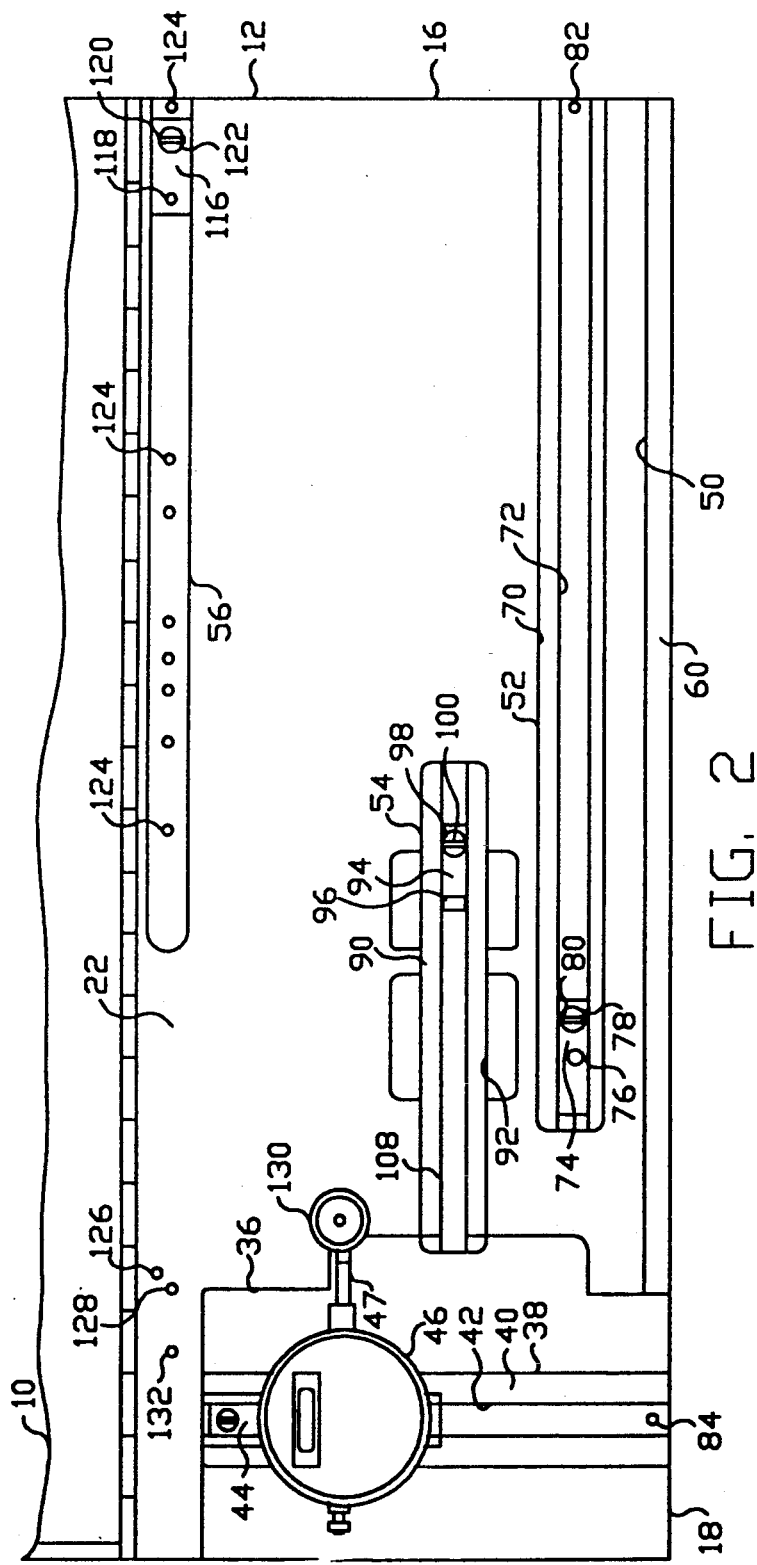
FIG. 2 is a top plan view of the gauge assembly shown in FIG. 1 with the nonflanged cylinder removed.

Making further reference now to FIG. 2, the top surface 22 of block 12 has four longitudinally extending grooves 50, 52, 54 and 56 defined therein. As further shown in FIGS. 3-7, longitudinally extending groove 50 extends along the front edge 18 of aluminum block 12 from the right hand edge 16 to the measurement well 36.

As best seen in FIGS. 5 and 6, groove 50 receives a longitudinally extending generally rectangular steel bar 60 having a rectangular cross section groove 62 defined in a rearward facing surface 64 thereof. Steel bar 60 may be received by and secured to groove 50 by bolts 68 which extend from the front edge of bar 60 into a front edge of the groove 50 to secure bar 60 in groove 50. In FIG. 5, groove 62 has a top surface 66 spaced a distance above the top reference surface 22 of block 12 which is slightly greater than the thickness of a cut body blank for a can. Groove 62 also extends slightly below the top surface 66 to enable an edge of a can body blank to be slid into the groove 62 without catching on a transition edge from top surface 22 to the bottom surface of groove 62.

A rectangular sheet metal cut body blank 150 (which is shown in a different position in FIG. 7) may have a front edge thereof pushed into the groove 62 in preparation for a length or width measuring test. Once the edge of body blank 150 is inserted into groove 62, body blank 150 is laid flat on the top reference surface 22 and groove 62 serves to provide a stable front edge reference position and at the same time tends to smooth out any waviness in the sheet metal body blank 150, particularly along the front edge which is inserted into the groove 62. A more accurate, stable and repeatable length or width measurement may then be taken.

The second longitudinal groove 52 is located near the front edge 18 of the aluminum block 12 in parallel spaced relationship to the first groove 50. Groove 52 is a rectangular cross-section groove that extends from the right edge 16 toward and into close proximity with the well 36 for measurement sensor 46. Groove 52 receives a rectangular cross-section steel insert 70 having a longitudinally extending slide defining groove 72 formed therein with the cross sectional shape of an inverted T. Slot or groove 72 thus forms a slide track for receiving a small slide bar 74 (FIG. 2) which slides therein. Slide bar 74 remains recessed below top surface 22, but has a vertically extending cylindrical post 76 pressed into slide bar 74 and extending above the top reference surface 22. Post 76 serves as a right hand position reference for taking certain relatively long measurements. The taking of long measurements is facilitated because groove 72 extends to the greatest distance from the measurement sensor 46. Also positioned on slide bar 74 is a vertically extending fastener pin 78 which threadedly engages a vertically extending threaded bore which extends all of the way through slide bar 74. The upper end of fastener pin 78 terminates in a flattened finger grip 80 which facilitates manual rotation of the fastener pin 78.

Once the slide bar 74 is longitudinally positioned at a desired reference location, the finger grip 80 is used to threadedly tighten fastener pin 78 against the bottom of the T-shaped groove 72. Slide bar 74 and reference pin 76 are thus secured in a desired reference position. When reference pin 76 is not being used for a measurement, the fastener pin 78 is loosened and slide bar 74 is slid to the right into engagement with a stop 82 which may simply be a post pressed into the bottom of the slot 72. Insert 70 may be maintained within the groove 52 by any suitable means such as bolts (not shown) which extend through the bottom side 24 of aluminum block 12 and into the bottom of insert 70 to secure insert 70 within groove 52.

Groove 54 is laterally positioned approximately midway between the front and back of top surface 22 and extends in parallel spaced relationship to groove 52 from a right hand edge of well 36 toward the right hand edge 16 of aluminum block 12. Groove 54 is shorter than groove 52 and terminates at a right end that is approximately midway between the left hand edge 14 and the right hand edge 16 of aluminum block 12. Groove 54 receives a rectangular cross-section steel insert 80 which is similar to the insert 72 except that insert 90 is shorter than insert 72. Insert 90 defines a longitudinally extending slot or groove 92 having a cross section in the shape of an inverted T. Slot 92 receives a slide bar 94 in mating sliding relationship therewith. Slide bar 94 remains recessed below top surface 22 and has extending from a top surface thereof a vertically extending, generally rectangular reference post 96 which is below the top reference surface 22. Reference post 96 has a planar reference surface facing the left end of slot 92.

Also extending from slide bar 94 is a fastening pin 98 which threadedly engages a vertically extending bore through the slide bar 94. Fastening pin 98 terminates in a finger grip 100 which may be manually grasped to rotate pin 100 and selectively tighten pin 100 against the bottom of insert 90 or release tightening pin 98 to allow slide bar 94 to be longitudinally slid within slot 92. When an operation takes place which requires a flat surface in the vicinity of slot 92, slide bar 94 is slid to the leftmost extremity.

A set of magnets 108 is disposed on either side of the slot 92 and extends along the upper edges thereof substantially flush with the top surface 22. The magnets 108 are particularly useful for accurately and repeatedly securing a nonflanged cylinder 30 to the slot 92 as best seen in FIG. 1. The positioning of the magnets 108 at the upper opposed side surfaces of the slot 92 can best be seen in FIG. 2.

The groove 56 has a rectangular cross-section and extends along the back edge 20 of aluminum block 12 in parallel spaced relationship to the grooves 50, 52 and 54. Groove 56 receives a slide bar 116 having a forwardly positioned reference pin 118 and a fastening pin 120. The top surface of slide bar 116 remains below top reference surface 22. Vertical reference pin 118 extends above the top reference surface 22, while the fastening pin 120 terminates in a finger grip 122 and passes through a vertically extending bore in slide bar 116 to threadedly engage a selected one of a plurality of longitudinally spaced threaded bores 124 in the bottom of groove 56. Unlike the grooves 52 and 54, groove 56 does not receive an insert defining a T-shaped slot and thus the slide bar 116 may only be secured at a discrete location wherein the fastening pin 120 may threadedly engage one of the securing holes 124. The pin 118 is utilized to provide one point of a three point reference for making squareness checks on rectangular sheet metal cut body blanks. For purposes of accuracy and repeatability, it is therefore desirable that the slide bar 116 not be continuously adjustable in position, but have a predetermined, fixed position for each different can size.

The remaining two points for the three point engagement for body blank squareness testing are provided by a pair of vertically extending posts 126, 128 which are secured to the top surface 22 adjacent the right hand edge of measurement well 36. Pin 126 is secured latitudinally in line with reference pin 118 adjacent the back edge 20 of aluminum block 12. Reference pins 126, 128 thus engage back and left hand edges respectively of a body blank being tested adjacent the back left hand corner. Pin 118 of slide 116 is positioned to engage the back edge of the cut body blank 150 adjacent the back right hand corner thereof (see FIG. 6). The cut body blank is thus accurately and repeatably positioned with a three point contact reference.

As best seen in FIGS. 2 and 3, a reference cylinder 130 has a downwardly projecting threaded pin 132 which threadedly engages a threaded bore in the top surface 22 of aluminum block 12 to removably secure cylinder 130 to surface 22. Reference cylinder 130 has a larger diameter reference surface section 136 adjacent the top surface 22 and a smaller diameter handle section 138 which is conveniently provided for manual rotation of reference cylinder 130 to permit threaded engagement and disengagement of threaded pin 132 into the top surface 22 of aluminum block 12. Cylindrical reference surface 136 has a diameter of approximately one inch. For convenience, reference cylinder 130 is illustrated in FIGS. 2 and 3 as being placed in an operative position opposite the measurement device 46. To enable measurement gauge 46 to make proper measurements, the reference cylinder 136 must extend at least into close proximity to well 36. In the preferred embodiment a small portion of the reference cylinder 136 that is in line with the center of cylinder 130 along a longitudinally extending center line 139 actually overlaps the recessed measurement well 36. However, in this operative position, the reference cylinder 130 would interfere with certain other measurement operations that do not use the reference cylinder 130. When these measurements are being made, the reference cylinder 130 is threadedly disengaged from the position shown and threadedly engaged into a threaded bore 132 in the top surface 22 of aluminum block 12 at a position to the left of reference pins 126, 128 at which the cylinder 130 can be stored indefinitely without interfering with other measurements.

Because the aluminum block 12 is relatively soft in nature compared with the hardness of the steel cans which are being measured, it has been found desirable to harden the top surface 22. This has been found to be advantageous in preventing the top surface 22 from being scratched and gouged during continued use. In particular, a process called electrolyzing has been found to provide a satisfactory hardening of the top surface 22.

A set of four legs or feet which may preferably be of a soft rubber or plastic material 140 are affixed to the bottom side 24 of aluminum block 12 adjacent each of the four corners. The feet 140 allow stationary location of the gauge assembly 10 upon a table or bench in the vicinity of an automated can manufacturing line. The feet also elevate block 12 to facilitate relocating the gauge.

The first step in the formation of a three piece metal can is production of a rectangular piece of sheet metal known as a cut body blank 150, which is shown in FIG. 7. In order to assure that an acceptable product can be manufactured in subsequent processing steps, the cut body blank 150 must meet certain tolerance specifications. These tolerance specifications typically relate to squareness, length, width and thickness. A test for squareness is illustrated in FIG. 7 wherein a rectangular sheet metal cut body blank 150 is laid flat on the top surface 22 with the left rear corner 142 secured in reference contact with reference post 126, 128 and the rear edge adjacent right rear corner 144 secured in reference contact with reference post 118 on slide bar 116. A flat surface is provided on top surface 22 for receiving cut body blank 150 by sliding slide bar 74 to the rightmost extremity of slot 72 and into engagement with stop post 82. This enables reference post 76 to be to the right of the right hand edge of cut body blank 150 so as not to interfere with the flat disposition of cut body blank 150 onto the top surface 22 of aluminum block 12.

With the cut body blank 150 thus placed into a secure and repeatable three point reference contact with reference posts 118, 126 and 128, the measurement device 46 is slid forward in slot 42 until a measuring arm 47 thereon engages the left hand edge of cut body blank 150 adjacent the left front corner 146 thereof. At this time the magnets 108 help to maintain the cut body blank 150 in a flat and stable condition.

Depending upon the particular configuration of the measuring device 46, either the measuring device 46 is set to zero or an initial reference measurement is taken. The cut body blank 150 is then rotated 180 degrees about a longitudinally extending axis and repositioned in contact with the reference pins 118, 126 and 128. A test measurement is then taken at the same position as the prior reference measurement and compared with the prior reference measurement. If the cut body blank 150 has perfectly square 90 degree corners, the reference and test measurements should be identical. Manufacturing imprecisions can cause small variations from exact 90 degree corners or perfect squareness. Manufacturing specifications will determine the degree to which the reference and test measurements may deviate before the cut body blank 150 is too far out of squareness to produce an acceptable final product.

Figure 9:
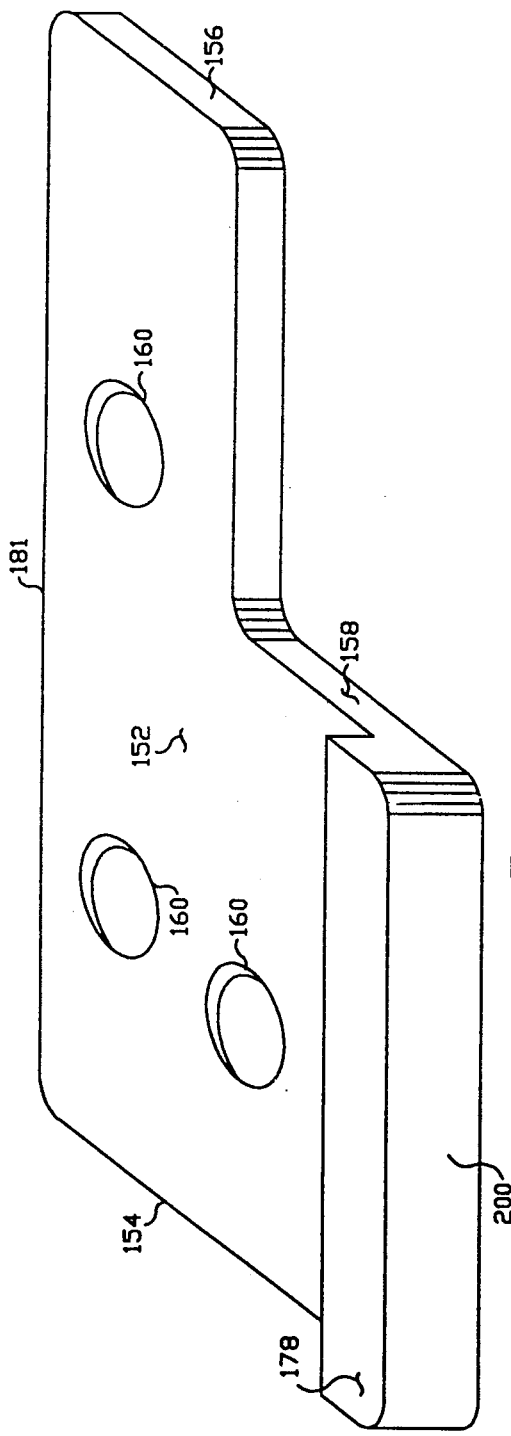
FIG. 9 is a perspective view of a gauge block used to initialize body blank length and width measurements for the gauge assembly shown in FIG. 2.

Referring now to FIG. 9, a length width gauge block 152 is used to define the nominal length and width for cut body blank 150. It will be appreciated that a different gauge block 152 will be required for each different can size. Gauge block 152 has a left reference edge 154, a long right reference edge 156 and a short right reference edge 158. The length of a cut body blank 150 is defined between left reference edge 154 and long right reference edge 156, while the width is defined between left reference edge 154 and short right reference edge 158. Three bores 160 provide convenient finger engagement holes for positioning of gauge block 152 and may also enable hanging gauge block 152 on a peg when it is not in use.

To measure the length of cut body blank 150, the measuring device 46 is slid in position on slot 42 until the measurement arm 47 is opposite slot 72. The gauge block 152 is then laid upon top surface 22 in opposed relationship to slot 72 with left reference edge 154 longitudinally positioned to an acceptable zero position for measuring arm 47. Slide bar 74 is then slid leftward in slot 72 until reference pin 76 engages the long right reference edge 156 of gauge bar 152. A reference measurement is then taken from measuring device 46 by either noting the current measurement reading or zeroing the measurement device 46. The gauge block 152 is then removed and a cut body blank 150 that is to be tested is positioned between measurement arm 47 and reference pin 76 with the front edge of the body blank 150 being inserted into longitudinally extending groove 62 to assure a flat, properly referenced positioning of the front edge of the cut body blank 150 that is to be tested. At this time the magnets 108 will further aid in maintaining a flat continuous contact between the bottom surface of the test body blank 150 and the top reference surface 22. A test length measurement is now taken and compared with the prior reference measurement to determine any difference therefrom. This difference can then be compared to specification tolerance standards to determine if the length of the cut body blank 150 is within tolerance limits.

The width measurement for the cut body blank 150 is taken in essentially the same manner as the length measurement except that the cut body blank 150 is rotated 90 degrees and one of the short edges is inserted into the front groove 62 as a reference position. In addition, the distance between left reference edge 154 and short reference edge 158 of gauge block 152 is used as the width reference distance. The gauge block is placed opposite slot 72 with the left reference edge 154 at an acceptable reference or zero position for measurement arm 47. Surface 200 of gauge block 152 is used as a reference against bar 60. The reference pin 76 is then slid into engagement with short reference surface 158. The gauge block 152 is then removed and the cut body blank 150 is inserted into groove 62 and positioned against reference pin 76. The test measurement can then be taken and compared to the prior reference measurement to determine the deviation in the width of the cut body blank 150 from the nominal design width specification.

To measure the thickness of a cut body blank 150, the reference post 96 is slid to the left into close proximity with the end of measurement arm 47. Most measurement devices 46 allow sufficient travel that the measurement device 46 can be zeroed against post 96 and then retracted a sufficient distance to allow an edge of a vertically extending cut body blank 150 to be placed between the reference stop 96 and the end of measurement arm 47. Measurement arm 47 is then released against the flat surface of cut body blank 150 and a measurement of the thickness thereof can be taken. Alternatively, a standard or reference thickness can be placed between reference post 96 and the end of measurement arm 47 and a reference measurement taken. The cut body blank 150 can then be inserted between reference post 96 and measurement arm 47 and a test measurement taken. The test measurement can then be compared with the prior reference measurement to determine if the thickness of the cut body blank 150 is within tolerance limits.

The next step in the can manufacturing process is to form the cut body blank 150 into a cylinder and weld the ends of the cut body blank together along a seam 32 as illustrated in FIG. 1 to form a nonflanged cylinder 30. The nonflanged cylinder is conventionally tested for cocky body deviations or cockiness at this point. For these tests the measuring device 46 is laterally positioned opposite slot 92.

The cocky body test determines the extent of inevitable small deviations from perfect alignment of the edges of the cut body blank as the ends thereof are secured together to form the seam 32. It will be noted that reference post 96 has a flat front or left hand reference surface as opposed to the cylindrical surfaces for reference posts 76 and 118. To measure cocky body gauge block 152 is used. The gauge is positioned so that upwardly extending key 178 is in slot 92 and the reference edge 181 is engaging bar 60. Reference edge 154 contacts measurement arm 47 for an acceptable zero of reference position. Reference post 96 is slid into engagement with reference edge 158. Fastening pin 98 is tightened to secure slide bar 94 and reference post 96 in the reference position. The gauge block 152 is now removed and cylinder 30 is measured at seam 32 with seam 32 positioned downward along slot 92 as shown in FIG. 1. Manufacturing tolerance standards will indicate whether or not the cocky body deviation is within acceptable limits. The left hand face of reference post 96 is sufficiently wide that regardless of which side of seam 32 the measurement arm 47 contacts, the left hand surface of reference post 96 extends across seam 32 and remains in contact with the right hand most edge of nonflanged cylinder 30 adjacent the seam 32. Reference post 96 will thus provide a constant, fixed reference position for the measurement.

As the can manufacturing process continues, the nonflanged cylinder is formed into a flanged cylinder by providing a radially outward flare, i.e. flange, at each end of the nonflanged cylinder to prepare the nonflanged cylinder for receipt of a disk shaped end cap. The flange is created by deforming and stretching the can material at each end to form the radially outward extending flanges. The flanged cylinder is then further tested to assure that it meets certain measurement standards.

Figure 10:
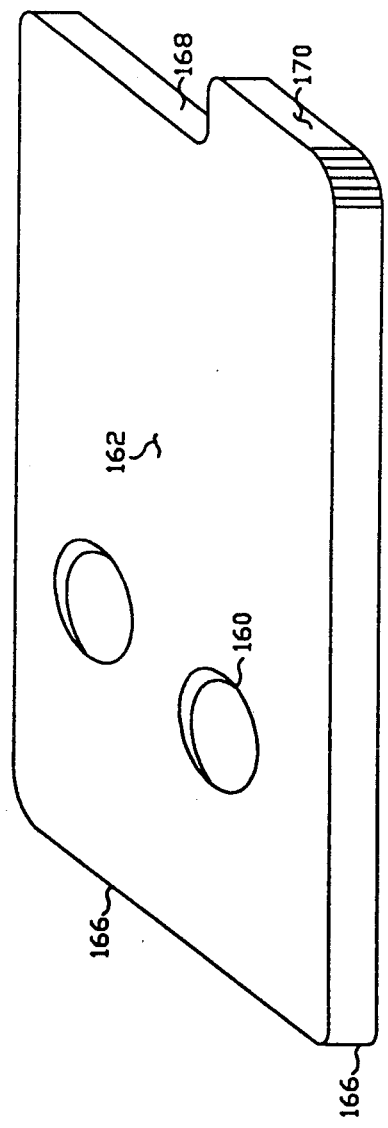
FIG. 10 is a perspective view of a gauge block used to initialize flanged cylinder and finished can height measurements for the gauge assembly shown in FIG. 2.

One test performed upon the flanged cylinder is a height test which normally uses the center slide 94 and post 96 thereon as a right hand position reference. A gauge block 162, which is illustrated in FIG. 10, may be used to position post 96 to establish a nominal design reference distance and to zero the measurement device 46.

Gauge block 162 has a left edge reference surface 166, two right edge reference surfaces 168, 170 opposite left edge reference surface 166. The longer distance between left reference edge 166 and right reference edge 170 defines the nominal height of a flanged cylinder. FIG. 8 illustrates in a vertical orientation, a flanged cylinder 180 having an upper flange 182 at the top end thereof and an identical flange at the opposite or bottom end.

Gauge block 162 is made sufficiently thin that it will sit within slot 92 and for the height measurement of a flanged cylinder the reference edges 166 and 170 are oriented toward the bottom of slot 92 and used to provide a reference length. The left reference edge 166 of gauge block 162 is slid into an acceptable zero or reference position for measurement arm 47 and the reference post 96 is slid into engagement with the right hand reference edge 170. The fastening pin 98 is then tightened to secure the slide bar 94 and reference post 96 in the reference position. A flanged cylinder 180 is then placed over slot 92 and longitudinally aligned therewith in a manner similar to the nonflanged cylinder 30 as illustrated in FIG. 1. At this time the magnets 108 aid in properly locating and securing the flanged cylinder 180 within the slot 92. Height measurements are then taken to determine if flanged cylinder 180 meets proper height specifications. Typically the height measurements are taken at three different locations which are spaced on either side of and opposite the seam 32.

Another test desired for the flanged cylinder is the measurement of the width or radially outward extent of the flanges relative to the nominal inside radius of the body portion or central portion of the flanged cylinder. This dimension is tested by placing the reference cylinder 130 at the reference position as illustrated in FIG. 2. The measurement device 46 is laterally slid in slot 42 until measurement arm 47 is aligned along center line 139 in opposed relationship to reference cylinder 130 as shown in FIG. 8. Measurement device 46 is then zeroed with respect to reference cylinder 130 or if necessary with respect to a reference spacer defining the desired nominal distance between the inner and outer radii of the flanged cylinder.

One end of the flanged cylinder is then placed over the reference cylinder 130 with the inner radius of a cylindrical surface thereof in contact with the reference portion 136 of reference cylinder 130. The flanged cylinder is then rotated slightly about the contact point with reference surface 136 until a minimum measurement is indicated by measurement device 46. This minimum measurement represents the desired test measurement and the radially outward extent of the flanges of the flanged cylinder. Typically this flange measurement is taken on either side of and opposite the seam 32 and an identical set of three measurements is taken for both ends of the flanged cylinder.

If the flanged cylinder satisfies dimensional specifications, it is converted into a factory finished can by attaching a disk-shaped piece of sheet metal to one of the flanged ends thereof.

The height of the factory finished can is then measured in substantially the same way as the height of a flanged cylinder. However, the securement of an end disk to one end of the factory finished can slightly shortens the height of the can and so the reference edges 166 and 16S of gauge block 162 (FIG. 10) are utilized as the reference height measurement. Again, the magnets 108 help to maintain the factory finished can in proper position in opposed relationship to slot 92 as the height measurements are taken. Typically the height measurements are taken on either side of and opposite the seam 32. The factory finished can is then transported to a location at which it is filled with a food item or some other material and closed by securing a sheet metal disk to the open, remaining flanged end of the factory finished can. The completed can is processed and may then be labeled and shipped to a distribution point for ultimate sale to a customer.

While there has been shown and described above a particular multimeasurement gauge assembly and method for performing all required measurements on a factory finished can during the manufacturing process therefor, for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A multimeasurement gauge assembly comprising:
   a measuring block having a top reference surface, a measuring well defined in the top reference surface, and a plurality of longitudinally extending grooves defined in the top reference surface on one side of the measuring well;
   a measuring device disposed in the measuring well, the measuring device having a measuring arm disposed to measure distances at the top reference surface, the measuring device being laterally movable to a plurality of different measurement positions, a measurement position being provided for each longitudinally extending groove; and
   at least one slide bar disposable within one of the longitudinally extending grooves and having a reference post extending above the top reference surface, the measuring device being laterally movable to a position opposite the reference post to measure an object disposed between the measuring device and the reference post.

2. A multimeasurement gauge assembly according to claim 1 wherein a reference post on one of said at least one slide bar has a planar surface facing the measuring device.

3. A multimeasurement gauge assembly according to claim 1 further comprising a cylindrical second reference post that is disposable at a selected position on the top reference surface with at least a cylindrical post surface facing the measurement device at one of the selected positions.

4. A multimeasurement guage assembly according to claim 3 wherein said cylindrical second reference post comprises a cylinder having a longitudinal central axis and a threaded stud extending from the cylinder along the central axis, and wherein at least two threaded bores are defined in the top reference surface to receive the stud of the cylindrical second reference post, one of the threaded bores being positioned at a location on the top reference surface that does not interfere with other measurements and a second threaded bore being positioned to place the cylindrical post at said selected position.

5. A multimeasurement gauge assembly according to claim 1 further comprising a plurality of elongated magnets, each extending along a longitudinal axis and each being disposed along an upper edge of one of the longitudinally extending grooves with each magnet having a top surface substantially flush with the top reference surface and with the longitudinal axis thereof extending parallel to the top reference surface.

6. A multimeasurement gauge assembly according to claim 1 further comprising a pair of reference posts extending from the top reference surface at a longitudinal position intersecting the measurement well and at a latitudinal position behind the measurement well, the pair of reference posts being disposed to engage different edges of a cut body blank adjacent a common corner, and a third reference post disposed to engage an edge of a cut body blank adjacent a corner different from said common corner to provide a three point position reference for performing measurements on cut body blanks.

7. A multimeasurement gauge assembly according to claim 1 wherein one of the longitudinally extending grooves is a front groove positioned along a front edge of the measuring block and further comprising a longitudinally extending elongated edge bar disposed in the front groove, the edge bar having a rear facing surface having a longitudinally extending groove formed therein which is elevationally positioned to extend from a position above the top reference surface downward to at least the top reference surface to receive an edge of a sheet of material being measured.

8. A multimeasurement gauge assembly comprising:
   a measuring block having a planar reference surface having a recess defined therein at a well region, the recess having at least one sidewall that intersects the planar reference surface; and
   a measurement gauge providing a length measurement indication disposed in the recess and securable therein at any one of a plurality of different positions to measure at the plane of the reference surface a part extending pas the recess sidewall to the well region.

9. A multimeasurement gauge assembly comprising:
   a measuring block having a reference surface, the reference surface having a recess bounded by a sidewall that intersects the reference surface defined therein at a well region of the reference surface; and
   a measurement gauge providing a length measurement indication secured within the recess at one of a plurality of different measurement positions at which the measurement device can measure at the reference surface a position of a selected point of a part, the part being positioned on the reference surface with the selected point being positioned past the sidewall and over the well region.

10. A multimeasurement gauge assembly comprising:
    a measuring block having a reference surface, the reference surface having a recess bounded by a sidewall that intersects the reference surface defined therein at a well region of the reference surface;
    a measurement device secured within the recess at one of a plurality of different measurement positions at which the measurement device can measure at the reference surface a position of a selected point of a part, the part being positioned on the reference surface with the selected point being positioned past the sidewall and over the well region; and
    a measurement slide mechanism disposed in the well region of the measuring block, the measurement slide mechanism slidably receiving the measurement device for securement at a position along the slide.

11. A multimeasurement gauge assembly according to claim 10 further comprising a positioning slide disposed in the reference surface of the measuring block outside of the well region thereof, the positioning slide receiving and supporting a reference post at a selectable position therealong, the reference post extending beyond the reference surface to provide a reference positioning contact for a part being measured.

12. A multimeasurement gauge assembly comprising:
    a measuring block having a reference surface, the reference surface having a recess bounded by a sidewall that intersects the reference surface defined therein at a well region of the reference surface;
    a measurement device secured within the recess at one of a plurality of different measurement positions at which the measurement device can measure at the reference surface a position of a selected point of a part, the part being positioned on the reference surface with the selected point being positioned past the sidewall and over the well region; and three fixed reference posts secured to the reference surface to receive and secure in a reference position a part to be measured, first and second ones of the fixed reference posts being disposed in close proximity to one another to respectively engage two intersecting edges of the part adjacent a corner formed by the intersecting edges, the third fixed reference post being spaced apart from the first and second fixed reference posts.

13. A multimeasurement gauge assembly comprising:

a measuring block having a reference surface, the reference surface having a recess bounded by a sidewall that intersects the reference surface defined therein at a well region of the reference surface;

a measurement gauge providing a length measurement indication secured within the recess at one of a plurality of different measurement positions at which the measurement device can measure at the reference surface a position of a selected point of a part, the part being positioned on the reference surface with the selected point being positioned past the sidewall and over the well region; and a position reference post having a reference surface forming at least part of a cylinder, the position reference post being secured to the reference surface with the post reference surface extending beyond a boundary edge of the recess.

14. A multimeasurement gauge assembly comprising:

a measuring block having a reference surface, the reference surface having a recess bounded by a sidewall that intersects the reference surface defined therein at a well region of the reference surface;

a measurement device secured within the recess at one of a plurality of different measurement positions at which the measurement device can measure at the reference surface a position of a selected point of a part, the part being positioned on the reference surface with the selected point being positioned past the sidewall and over the well region; and a position reference post having a reference surface forming at least part of a cylinder, the position reference post being secured to the reference surface with the post reference surface extending beyond a boundary edge of the recess, the position reference post being positionable at each of two locations on the reference surface in secured relationship therewith, one of said locations maintaining the post reference surface spaced apart from the recess.

15. A multimeasurement gauge assembly comprising:

a measuring block having a reference surface, the reference surface having a recess bounded by a sidewall that intersects the reference surface defined therein at a well region of the reference surface;

a measurement device secured within the recess at one of a plurality of different measurement positions at which the measurement device can measure at the reference surface a position of a selected point of a part, the part being positioned on the reference surface with the selected point being positioned past the sidewall and over the well region; and a bar extending along a boundary of the reference surface, the bar having defined therein a groove extending along a boundary edge of the reference surface to receive and retain an edge of a sheet of material being measured and to eliminate any waviness along the edge of the sheet of material that is retained by the groove.

16. A multimeasurement gauge assembly comprising:

a measuring block having a planar reference surface, the reference surface having a recess bounded by a sidewall that intersects the reference surface defined therein at a well region of the reference surface; and a measurement device secured within the recess at one of a plurality of different measurement positions at which the measurement device can measure in the plane of the reference surface a position of a selected point on a part, the part being positioned on the reference surface with the selected point being positioned past the sidewall and over the well region.

17. A multimeasurement gauge assembly comprising:

a measuring block having a planar reference surface, the reference surface having a recess defined therein at a well region of the reference surface, the recess having a boundary sidewall that intersects the reference surface;

a measurement slide mechanism disposed within the recess;

a measurement device slidably secured to the measurement slide mechanism within the recess, the measurement device being slidable to and securable at any selected one of a plurality of measurement positions within the recess and having a measurement arm disposed to engage a part at a measurement point in the plane of the reference surface to measure the position of said measurement point; and at least one positioning slide mechanism secured to said measuring block opposite one of the measurement positions, the positioning slide mechanism including a slide member that is slidably secured to the measuring block and has mounted thereon a positioning reference post that extends beyond the reference surface to engage and provide a reference position for the part that is being measured.

18. A multimeasurement gauge assembly according to claim 17 further comprising first, second and third reference posts extending from the reference surface to engage the part being measured and provide a secure and repeatable three point position reference therefore.

19. A multimeasurement gauge assembly according to claim 18 wherein the first and second reference posts are fixedly secured to the reference surface in close proximity to one another in a relationship that enables the first and second reference posts to engage different edges of the part to be measured which intersect at a square corner with the first and second posts engaging the intersecting edges adjacent the corner and wherein the third reference post is slidably secured to the reference surface to engage the part to be measured at a location spaced apart from the first and second reference posts.

20. A multimeasurement gauge assembly according to claim 19 wherein the third reference post is slidable in a track that extends in parallel spaced relationship to the first and second positioning slide mechanism.

21. A multimeasurement gauge assembly according to claim 17 wherein the first positioning slide mechanism has a positioning reference post mounted thereon that has a planar surface facing the recess for cylindrical height and thickness measurements and wherein the second slide mechanism has a positioning reference post mounted thereon that has a cylindrically shaped surface facing the recess for length and width measurements.

22. A multimeasurement gauge assembly according to claim 17 further comprising a removable reference post that is removably securable to the reference surface at a location outside the recess but with a cylindrical reference surface that extends beyond the recess.

23. A multimeasurement gauge assembly comprising:
a measuring block having a planar reference surface, the reference surface having a recess defined therein at a measuring well region of the reference surface, the recess having a boundary sidewall that intersects the reference surface;
a measurement device slidably positioned within the recess, the measurement device being slidable to and securable at any selected one of a plurality of different measurement positions within the recess and having a measurement arm disposed to engage a part at a measurement point in the reference plane to measure the position of said measurement point; and
a reference cylinder removably secured to the reference surface in opposed relationship to one of the measurement device measurement positions, the reference cylinder having a cylindrically shaped reference surface adjacent the plane of the planar reference surface, the cylindrically shaped reference surface of the reference cylinder extending over the well region.

24. A multimeasurement gauge assembly comprising:
a generally rectangular base member having first and second opposed ends, first and second opposed sides and a planar top surface extending between the first and second ends and the first and second sides of the base member;
a laterally extending slide track disposed on the base member adjacent the first end of the base member;
a measuring device having a position sensing member, the measuring device being slidably coupled to the laterally extending slide track;
a first longitudinally extending slide track disposed on the base member and extending along a first longitudinal axis which intersects the laterally extending slide track;
a first slide member having a first reference stop member extending above the top surface, the first slide member being slidably coupled to the first longitudinally extending slide track;
a second longitudinally extending slide track disposed on the base member and extending along a second longitudinal axis which intersects the laterally extending slide track, the second longitudinally extending slide track being disposed in parallel spaced relationship to the first longitudinally extending slide track,
a second slide member having a second reference stop member just below the top surface, the second slide member being slidably coupled to the second longitudinally extending slide track;
a third longitudinally extending slide track disposed on the base member and extending along a third longitudinally extending axis, the third longitudinally extending slide track extending in parallel spaced relationship to the first and second longitudinally extending slide tracks;
a third slide member having a third reference stop member extending above the top surface, the third slide member being slidably coupled to the third longitudinally extending slide track; and
a cylindrical reference member that is selectively positionable at a first position that does not interfere with measurements by the measuring device and at a second position opposite the laterally extending slide track at which the cylindrical reference member can provide a reference surface for measurement of an object by the measuring device.

* * * * *

UNITED STATES PATENT AND TRADEMARK OFFICE
CERTIFICATE OF CORRECTION

PATENT NO. : 5,148,611

DATED : September 22, 1992

INVENTOR(S) : David W. Raetzel

It is certified that error appears in the above-identified patent and that said Letters Patent is hereby corrected as shown below:

Col. 5, line 26:  "80" should be -- 90 --;

Col. 10, line 45: "16S" should be -- 168 --;

Col. 11, line 32: "guage" should be -- gauge --; and

Col. 12, line 16: "pas" should be -- past --.

Signed and Sealed this

Nineteenth Day of October, 1993

Attest:

BRUCE LEHMAN

Attesting Officer

Commissioner of Patents and Trademarks